Aug. 7, 1934.  O. J. W. LOUGHEED  1,969,618
PROCESS FOR RECLAIMING AND RECONDITIONING SAWS
Filed Nov. 14, 1931
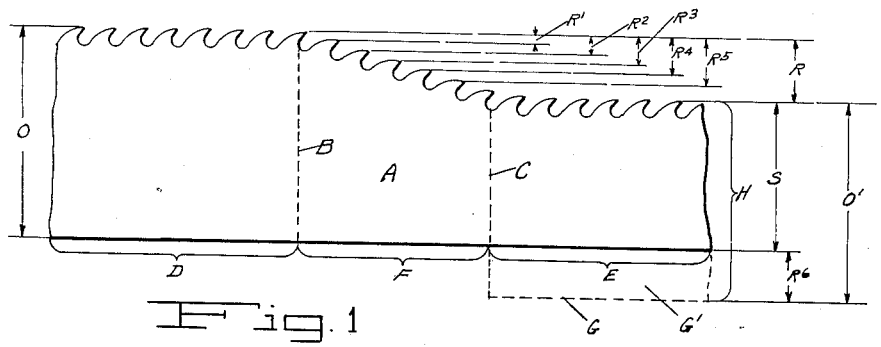
Fig. 1
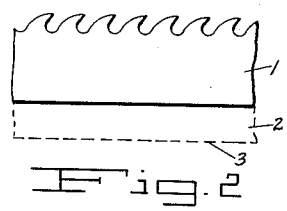
Fig. 2
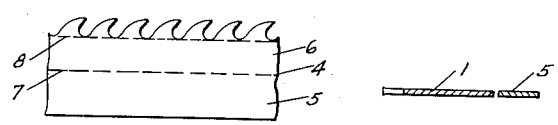
Fig. 3
Fig. 5
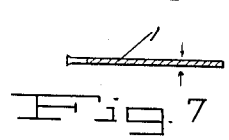
Fig. 6
Fig. 7
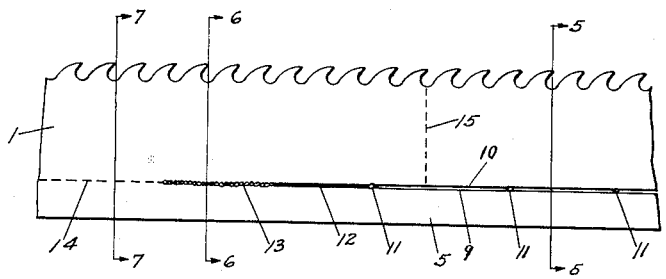
Fig. 4
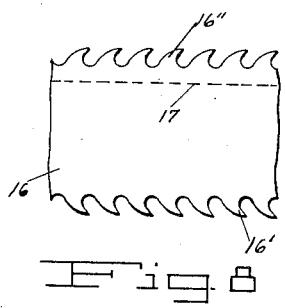
Fig. 8
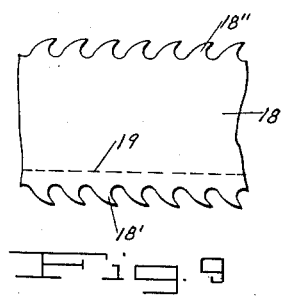
Fig. 9
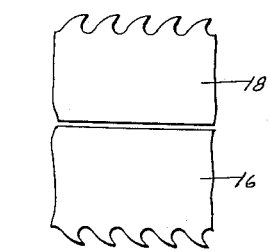
Fig. 10
Inventor
Overend J. W. Lougheed
By Clive Hartson
His Attorney Patented Aug. 7, 1934

1,969,618

UNITED STATES PATENT OFFICE 1,969,618

PROCESS FOR RECLAIMING AND RECONDITIONING SAWS

Overend J. W. Lougheed, Portland, Oreg.

Application November 14, 1931, Serial No. 575,049

6 Claims. (Cl. 76—112)

The present invention relates to the art of reclaiming or reconditioning discarded saws. The invention contemplates reclaiming discarded saws, especially large band saws used in the head rigs of saw mills, wherein such saws have been worn down, or their width has otherwise been reduced, through filing, grinding, toothcutting and the like to a degree that necessitates their being discarded.

This invention contemplates welding two or more discarded saw blades, or portions of such blades as may be suitable for the purpose, to one another along their longitudinal edges. The result of such welding is to produce a blade having a width equal to the sum of the widths of the blade portions or blades which have been so united. By this process a worn blade can be restored to its original width, or the width when first placed into operation, by welding thereto a strip of sufficient width. The invention may be practiced in the reconstruction of single cut saws as well as double cut saws, that is to say, saws having teeth cut in one edge or in both edges. In the reconstruction of double cut saws, the teeth are cut from one edge and a strip of the required width and having the requisite teeth is welded thereto.

In the reconstruction of the larger types of band saws, taking into consideration that the scrapped saws are practically valueless when compared to their cost when new, the saving effected through the practice of this invention amounts to fifty per cent or more of the original costs of a saw of the type reclaimed. This saving, when it is considered that a reclaimed saw has been found to give as satisfactory service as a new saw, is a very considerable item.

From the foregoing it will be apparent that the present invention achieves numerous objects one of which is the process whereby discarded saws can be restored to their original usefulness.

Another object of the invention is the process of reclaiming or widening a worn saw blade by welding another saw blade, or a strip of a saw blade, thereto.

Another object of the invention is the reconstruction of double cut band saws by welding a requisite strip along one edge thereof after the teeth have been removed from such edge.

Another object of the invention is the art of restoring worn and discarded saws to their original usefulness at a cost substantially less than the original costs of such saws when new.

Another object of the invention is the art of restoring worn saws to their original width.

Other objects of the invention will readily become apparent on reading the specification which follows, aided by the illustrations afforded by the accompanying drawing, wherein—

Figure 1 is a diagrammatic view of a saw blade giving the history of a saw from the time it was new and first placed into operation until the time it was discarded by reason of lack of width required for further operation.

Figures 2, 3 and 4 are side elevations of fragmentary portions of band saw blades.

Figures 5, 6 and 7 are the cross-sectional views indicated by section lines 5—5, 6—6 and 7—7 respectively, in Figure 4.

Figures 8, 9 and 10 are side elevations of fragmentary portions of double-cut band saw blades.

Similar characters indicate similar members throughout the several views.

The present process is capable of being practiced upon various types of saw blades, and being especially suited for reclaiming or reconditioning elongated blades of the endless or band type, the description following, dealing with the reclaiming of the large band saws used in the head rigs of saw mills, will disclose the manner of practicing this process. Those familiar with the art are aware that saws of this character, on account of the severe use and service to which they are subjected, are somewhat short lived. This is occasioned, aside from breakage and defects in the saw metal, by the fact that the teeth thereof after but short intervals of use must be filed or ground. This filing or grinding of teeth, repeated over a period of time, will noticeably decrease the width of the blade from the tips of the teeth to the rear edge. Not alone this, but the depth of the teeth must be increased, or new teeth cut from time to time, thereby reducing the width of the body of the blade, so that after an interval of time the blade becomes so reduced in width that it must be discarded. After the blade has been discarded, though it may still retain from two-thirds to three-fourths of its original width, it practically has no value other than scrap. While a discarded saw, in some instances, may be used in a smaller saw machine, this usually requires a reduction in its gauge by grinding, a costly and usually unsatisfactory operation.

The present process has in mind the restoration of a saw of this character to its original width, and therefore, to its original usefulness. This is accomplished by welding to one edge of the discarded blade a strip of saw metal having the same characteristics. The width of this added strip being equal to the loss of width previously incurred by the blade to which it is united.

In order to more fully comprehend the intent and operation of this invention, attention is called to the diagram in Figure 1. This diagram illustrates the successive historical states in the life of a saw blade. In this view, the full outline A represents a saw from the time it was first put into operation until the time it was discarded on account of its decreased width. Blade A has three historical divisions, D, E and F, isolated from one another by the dotted lines B and C, which divisions represent three phases of the life history of a saw, to-wit: D, the saw when new and first put into operation; E, the saw after having been placed into operation and reduced in width to the point that it is discarded; and F, the transitional stage of the saw between the time it was first put into operation and the time it was discarded.

When the saw was new and was first put into operation it had an original width O, and when discarded it had a discard or scrap width S which is less than the original width an amount equal to the reduction in width R. The division F illustrates the transitional stage of the saw as it is being gradually reduced in width. Five intermediate steps are shown, R1, R2, R3, R4 and R5. These five steps illustrated, are merely to give an idea of how the blade is actually reduced in width. In the life of a saw, the successive steps in the reduction of its width are not so abruptly or sharply defined. The several steps of the width reduction, R1 etc. indicate the reduction through cutting of new teeth, increasing the depth of the teeth, and other operations tending to reduce the width of the blade body proper until it has reached the scrap stage E.

As previously stated, the present invention contemplates reclaiming the blade after it has been reduced to the scrap stage E. The reclamation process contemplates adding to the blade a strip sufficiently wide to compensate for the loss of width sustained by such blade. To illustrate, the dated line G in Figure 1 may be considered as outlining a strip G' which is united to the rear edge of the blade. Strip G' is homogeneously welded to the blade E, resulting in a restored or reclaimed blade H having a width O' equal to original width O, it being understood that the width R6 of strip G' is equal to the total reduction in width R. Blade division E may be considered as representing an elongated or band saw blade, to which is added the strip G' having a corresponding length.

In carrying this invention into actual practice it is proposed to salvage suitable portions from scrapped saws and unite them by a suitable welding process for the purpose of making one or more reclaimed saws. As an illustration, Figure 2 shows a scrapped saw blade 1 needing a strip 2, indicated by the dotted outline 3, to restore it to its original width. Such a strip would be welded to its rear edge in the position occupied by the proposed strip 2. A strip for this purpose is cut from another scrapped saw, as saw 4 in Figure 3. As will be seen in this figure, blade 4 is of suitable width to provide two such strips, 5 and 6, which are cut therefrom along the lines 7 and 8. Figure 4 shows strip 5 being welded to blade 1, one edge 9 of the one to the rear edge 10 of the other. Preliminary to carrying on the main welding operation, and to prevent the seam spreading, tacks or small welds 11 are made at spaced intervals. These tack welds integrally join the strip and blade in those regions, and effectively prevent the seam spreading as before indicated. After this has been done, the strip is homogeneously welded to the blade.

Any suitable welding process capable of effecting a homogeneous or integral union between the strip and blade may be used for that purpose. Most satisfactory results have been achieved through the use of the oxy-acetylene process. In this instance the flame of the oxy-acetylene torch is applied to small portions of the juxtaposed edges of the seam until these edge portions are reduced to a comingling molten mass. Care must be taken during the welding and as it progresses to avoid a metal deficiency in the welding region. This can be taken care of by adding additional metal, which may be done by introducing the tip of a welding rod into the torch flame and transforming it into a molten state wherein it readily comingles with the molten metal of the saw members. The welded portions are subjected to forging, both in the presence of the torch flame properly controlled, and in its absence. This process is continued until the entire seam is welded. The saw blade is given tempering treatment during the welding operation and/or subsequent thereto. Also the welded region is ground and polished level with the plate face. In Figure 4 is indicated three phases in the operation, first, the open seam 12 ready for welding; second, the welded seam 13 which projects somewhat above the plate faces; and third, the completed weld, ground and polished. The completed weld is ordinarily unnoticeable and its presence is indicated by the dotted line 14 in Figure 4, and the arrows in Figure 7.

In transforming an elongated saw blade into a band saw, it has been found that welding the ends together to obtain this result has given greater satisfaction than brazing. In Figure 4 the dotted line 15 indicates where the ends of blade 1 were united by such a butt weld. In joining strip 5 to blade 1 it is desirable to have an unwelded portion of this strip opposite butt weld 15.

In welding the strips to the blades, it is to be understood that strip and blade are placed edge to edge, and united by what is termed a butt weld, the strip forming a transverse continuation of the blade, and the corresponding faces of strip and blade being in the same planes. As a matter of fact, after the welding has been properly completed, blade and strip are integrally united into one member, and enlarged blade 1.

This process may be applied to the reclamation of double cut saws as well as single cut saws. This is illustrated in Figures 8, 9 and 10. In Figure 8 blade 16, provided with two sets of teeth 16' and 16" is to be widened or reclaimed. One set of teeth is cut or sheared from the blade, as for instance teeth 16" along line 17. Another blade 18, Figure 9, is prepared in the same way. This blade has two sets of teeth 18' and 18". One set is removed along line 19. The teeth 18" remaining on blade 18 should correspond with teeth 16" which were removed from blade 16. The two blades, 16 and 18, are positioned with their sheared edges opposite one another, as in Figure 10, and are then united as has been previously explained. The width of the strips to be sheared from blades 16 and 18 is to a great extent determined by the width desired in the reclaimed saw.

While the foregoing description has had in mind the reclamation of the larger types of band saws, it is not to be understood that this process deals solely with such. Practically all types of saws may be reclaimed through this process. However, the saving effected in reclaiming the larger saws is of such great importance that it has been considered wise to disclose this invention in its relation thereto.

I claim:—

1. The process for reclaiming elongated saw blades of diminished width, particularly those of the band saw type, which consists in integrally uniting to one edge of such a blade a strip of similar material, such strip being joined in a manner that each face of such strip is in the plane defined by the corresponding face of the saw blade, such union resulting in a reclaimed blade of the desired width.

2. The process for reclaiming elongated saw blades such as band saws, which consists in shearing a strip from a saw blade, uniting one edge of such strip to and continuously along one edge of another blade, such union resulting in a blade having a transverse width substantially equal to the total width of strip and blade.

3. A process for reclaiming an elongated saw blade of diminished width, comprising welding to the rear edges of such a blade a strip taken from another blade so that the reclaimed blade is restored to the desired width, forging the welded portions, and tempering the reclaimed blade.

4. A method of reconditioning double cut saw blades of decreased width, comprising cutting from a blade one of the sets of teeth, and replacing such removed teeth with another set of teeth formed on a strip of sufficient width to give to the reconditioned blade the desired width.

5. The herein disclosed process for reconstructing an elongated saw to overcome a deficiency of width, which comprises forming from a piece of suitable blade material a strip having a length substantially equal to such saw, and a width of not less than its deficiency in width, positioning strip and saw with regard to each other that an edge extending longitudinally of the one is in juxtaposition to a similar edge of the other, and uniting strip and saw along such juxtaposed edges by a continuous butt weld extending from end to end, whereby such strip becomes an integral portion of the saw blade and increases the width thereof to the extent of its own width.

6. The process for restoring or increasing the width of an elongated saw which comprises preparing a strip of suitable material, such as a strip sheared from another saw blade, that it has a length substantially equal to the length of such saw, and a width not less than its proposed increase of width, positioning such strip and blade with regard to one another that a toothless edge extending longitudinally of the one is in juxtaposition to a similar edge of the other, and uniting strip and saw along such juxtapositioned edges by a continuous butt weld extending from end to end, whereby such strip becomes an integral portion of the saw blade and increases the width thereof to the extent of its own width.

OVEREND J. W. LOUGHEED.